No. 728,411. Patented May 19, 1903.

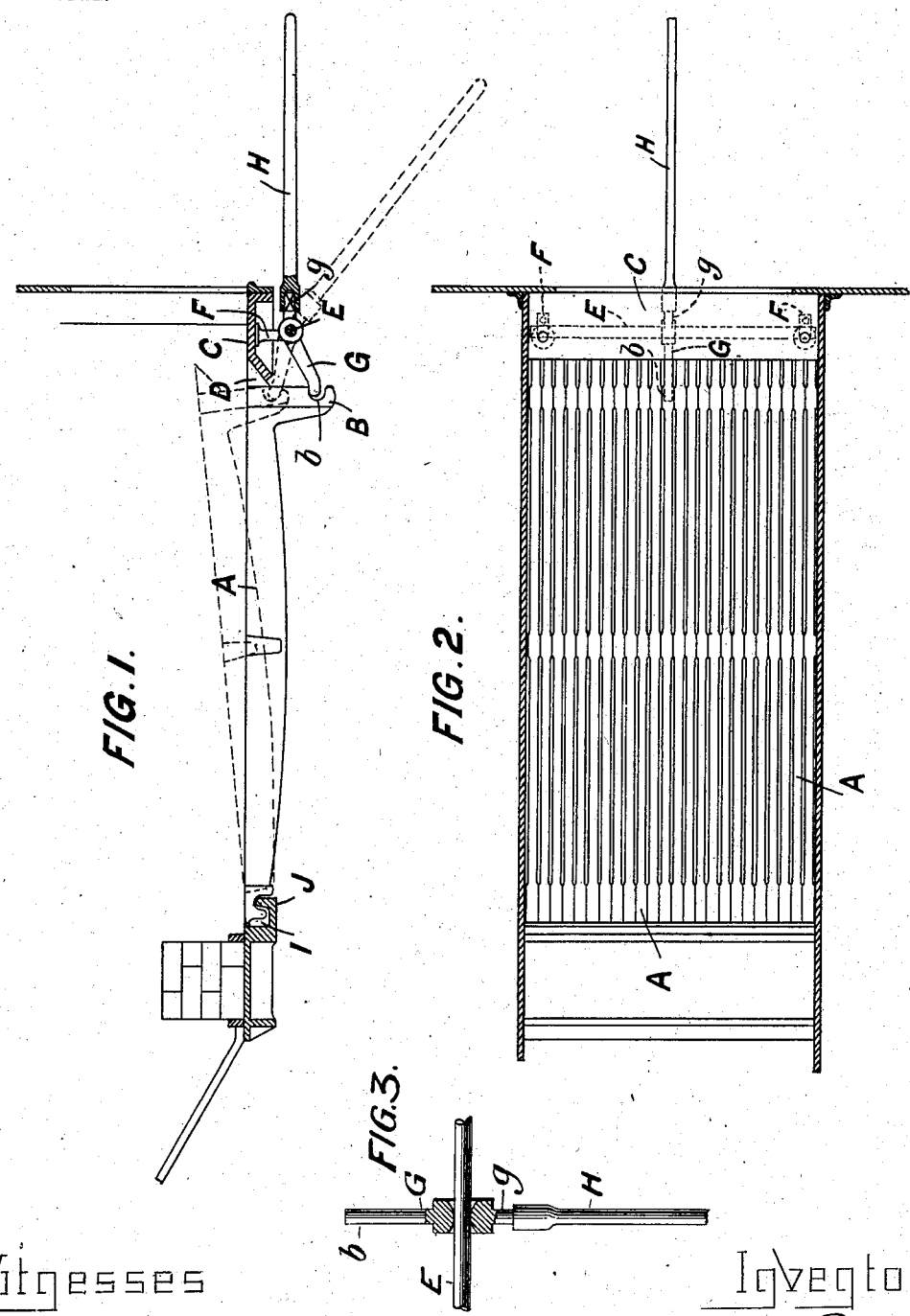

UNITED STATES PATENT OFFICE.

WILLIAM RAILTON AND RICHARD CAMPBELL, OF LIVERPOOL, ENGLAND, ASSIGNORS OF ONE-THIRD TO JOHN FORCER CRAWFORD, OF LIVERPOOL, ENGLAND.

FURNACE.

SPECIFICATION forming part of Letters Patent No. 728,411, dated May 19, 1903.

Application filed September 23, 1902. Serial No. 124,596. (No model.)

*To all whom it may concern:*

Be it known that we, WILLIAM RAILTON and RICHARD CAMPBELL, engineers, subjects of the King of Great Britain, residing in Liverpool, in the county of Lancaster, England, (whose full postal address is Washington Foundry, Fulton street, Liverpool aforesaid,) have invented certain new and useful Improvements in or Connected with Furnaces, (for which application has been made in Great Britain, No. 8,654, dated April 14, 1902,) of which the following is a specification.

This invention relates to furnaces, and has for its object a simple means for facilitating the removal of clinker or ash from the grate and for enabling any of the grate-bars to be moved as required for any purpose.

In the accompanying drawings, Figure 1 is a sectional elevation of a furnace with our invention applied thereto; Fig. 2, a plan thereof; Fig. 3, a detail of the actuating-lever and its suspending bar or rod.

In carrying the invention into effect a lug or hanger B is formed beneath each grate-bar A at the forward end, each lug having a socket *b* in its front face. The grate-bars A are supported in the usual manner upon cross-plates C, either having ledges or beveled faces, which are adapted to be engaged by similar faces D on the ends of the grate-bars A, and the said bars at their opposite ends may be inserted in slots I in the rear plate J, so as to hinge about the latter. The bars are not connected together, but each is free and can be moved vertically without disturbing any of the others.

Beneath the front plate C of the furnace is suspended a horizontal bar E, the hangers F, by which said bar is suspended, being preferably screwed into the under side of the front plate C and being provided with horizontally-arranged forks or lugs at their lower ends, into which the horizontal bar E may be slipped, and in which said bar may be secured by suitable bolts, preferably passing through the lugs on said hanger. The center part of said horizontal bar E is free from any obstruction, the supporting-hangers F being arranged at the ends of the bar E beyond the sides of the grate. On the said bar is mounted a double lever G, the forward end of which is adapted to engage in the socket *b* on the hangers or lugs B of the grate-bars. The lever is so mounted on the horizontal bar E that it can be slid along the whole length of the furnace-front into any desired position, and can thus be made to engage with any one of the hangers on the grate-bars. The portion of the lever which engages around the horizontal bar is preferably bell-shaped, so as to allow the lever to be rocked sidewise to some extent and to render its movement along the horizontal bar very easy. A squared or otherwise-shaped arm *g* projects outward from the said lever and is adapted to be engaged by a handle H or bar having a socket in its end. The forwardly-projecting part of the lever may, if desired, be connected with the other part around the bar by lugs and bolts in order to facilitate the mounting of the lever on the horizontal bar.

When it is desired to clinker the furnace, the stoker fits the socketed handle H upon the end of the pivoted lever G and moves the latter along the horizontal bar E to the grate bar or bars A which require to be moved. He then depresses the handle H, and as the forward end of the lever engages in the lug on the grate-bar the said bar is raised and shaken, as required. If the grate-bar should become wedged in its raised position, the stoker may force it down again by pulling upward upon the handle H, thereby causing the lever to press upon the lower side of the socket in the hanger on the grate-bar, thus forcing the latter down into position again.

Of course any number of the bars can be acted upon in this manner, as is found necessary, and when not in use the handle H is removed and the apparatus does not then project beyond the front of the furnace. The handle might also be hinged horizontally to the lever and be folded back out of the way when not in use.

It will be readily understood that the apparatus can be adapted for use with furnaces already constructed, as the hangers or lugs may be formed separately and bolted upon the ordinary grate-bars of said furnaces.

We declare that what we claim is—

1. A furnace-grate comprising grate-bars supported therein, a depending lug or hanger at the forward end of each bar, in combination with a horizontal bar fixed stationary in front of, and transversely to, the furnace, and a lever mounted on said bar, and capable of being moved into such a position as to engage in any one of the bars which requires to be moved, and means for operating said lever up and down.

2. In a furnace-grate, the combination with the fire-bars of a depending hanger at the forward end thereof, a socket or embayment at the front of each hanger, a horizontal bar fixed transversely in front of the furnace, and a lever mounted on said horizontal bar whose end is capable of being inserted into any of the hanger sockets or embayments, whereby the lever can be slid along the whole length of the furnace-front to any desired position and made to engage with any one of the hangers on the grate-bars.

3. In a furnace-grate, the combination with the fire-bars of a depending hanger at the forward end of each bar, a horizontal bar fixed transversely in front of the bars, a lever with a bell-shaped or splayed hole so mounted on said bar as to allow the lever to be rocked sidewise to some extent and render its movement along the bar very easy, said lever being adapted to engage any of the hangers, a squared or otherwise-shaped arm projecting outward from said lever, and a handle having a socket at its end adapted to engage on the squared arm.

In witness whereof we have hereunto signed our names this 10th day of September, 1902, in the presence of two subscribing witnesses.

WILLIAM RAILTON.
RICHARD CAMPBELL.

Witnesses:
G. C. DYMOND,
JOHN MCLACHLAN.